US012277143B2

(12) United States Patent
Fujii

(10) Patent No.: US 12,277,143 B2
(45) Date of Patent: Apr. 15, 2025

(54) APPARATUS, METHOD, AND COMPUTER READABLE MEDIUM FOR EVALUATING THE STATE OF A FACILITY

(71) Applicant: Yokogawa Electric Corporation, Tokyo (JP)

(72) Inventor: Ryohei Fujii, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 263 days.

(21) Appl. No.: 17/693,401

(22) Filed: Mar. 13, 2022

(65) Prior Publication Data

US 2022/0309078 A1 Sep. 29, 2022

(30) Foreign Application Priority Data

Mar. 26, 2021 (JP) .................................. 2021-053941

(51) Int. Cl.
*G06F 16/28* (2019.01)
*G06F 16/25* (2019.01)

(52) U.S. Cl.
CPC .......... *G06F 16/285* (2019.01); *G06F 16/258* (2019.01)

(58) Field of Classification Search
CPC .... G06F 16/285; G06F 16/258; G06F 16/906; G06F 16/1794; G06F 16/953; G06F 16/90
See application file for complete search history.

(56) References Cited

U.S. PATENT DOCUMENTS

2006/0149558 A1* 7/2006 Kahn .................... G10L 15/063
704/278
2012/0069131 A1* 3/2012 Abelow .............. G06Q 30/0601
345/589

(Continued)

FOREIGN PATENT DOCUMENTS

JP 2016191975 A 11/2016
JP 2020035039 A 3/2020

(Continued)

OTHER PUBLICATIONS

Extended European Search Report for counterpart European Application No. 22161553.7, issued by the European Patent Office on Aug. 12, 2022.

(Continued)

*Primary Examiner* — Kris E Mackes
*Assistant Examiner* — Cecile H Vo

(57) ABSTRACT

An apparatus is provided that includes an acquisition unit for acquiring target state data that are the state data in the target domain and source state data that are state data in a source domain and to which a label indicating a quality of a state is added; a conversion generation unit for generating a conversion rule of the target state data and the source state data into data of a common space based on distribution of the target state data and the source state data; a model generation unit for generating classification model for classifying a quality of a state indicated by the target state data in the common space using data of the common space to which the label is added; and an evaluation unit for evaluating the classification model using the source state data converted into data of the common space.

11 Claims, 7 Drawing Sheets

(56) References Cited

U.S. PATENT DOCUMENTS

| | | | | |
|---|---|---|---|---|
| 2014/0075004 A1* | 3/2014 | Van Dusen | ............ | G07C 13/00 |
| | | | | 709/223 |
| 2017/0358045 A1* | 12/2017 | Takeda | ................... | G06Q 50/18 |
| 2020/0057416 A1* | 2/2020 | Matsubara | ............. | G06N 20/10 |
| 2021/0014144 A1 | 1/2021 | Iwai | | |
| 2021/0182701 A1* | 6/2021 | Jeyachandran | ........ | G06N 20/00 |
| 2021/0201159 A1* | 7/2021 | Song | ....................... | G06N 3/045 |
| 2022/0207865 A1* | 6/2022 | Muhammad | .............. | G06F 3/00 |
| 2022/0343631 A1* | 10/2022 | Namiki | ................ | G06V 10/761 |

FOREIGN PATENT DOCUMENTS

| | | |
|---|---|---|
| JP | 2020177508 A | 10/2020 |
| JP | 2021039641 A | 3/2021 |
| WO | 2019176997 A1 | 9/2019 |

OTHER PUBLICATIONS

Office Action issued for counterpart Japanese Application No. 2021-053941, issued by the Japanese Patent Office on Feb. 21, 2023 (drafted on Feb. 13, 2023).

Ryohei Fujii, Applicability of Transfer Learning to Plant Data, Yokogawa Technical Review vol. 63 No. 1, Japan, Yokogawa Electric Corporation, Jul. 6, 2020, pp. 17-22.

* cited by examiner

APPARATUS, METHOD, AND COMPUTER READABLE MEDIUM FOR EVALUATING THE STATE OF A FACILITY

BACKGROUND

1. Technical Field

The present invention relates to an apparatus, a method, and a computer readable medium.

2. Related Art

Patent document 1 describes that it is determined whether the prior domain acquired by the acquisition unit is effective for transfer learning by using all the leaf nodes composing the decision tree generated by the trial transfer learning unit.

PRIOR ART DOCUMENT

Patent Document

Patent document 1: Japanese Patent Application Publication No. 2016-191975

SUMMARY

A first aspect of the present invention provides an apparatus. The apparatus may include an acquisition unit for acquiring target state data that are the state data in a target domain, and source state data that are the state data in a source domain and to which a label indicating the quality of the state is added. The apparatus may include a conversion generation unit for generating, based on the distribution of the target state data and the source state data, a conversion rule from the target state data and the source state data into the data of a common space. The apparatus may include a model generation unit for generating, by using the data of the common space to which the label is added, a classification model for classifying the quality of the state indicated by the target state data in the common space. The apparatus may include an evaluation unit for evaluating the classification model by using the source state data converted into the data of the common space.

The second aspect in the present invention provides an apparatus. The apparatus may include a conversion execution unit for converting, based on the distribution of target state data that are the state data in a target domain and source state data that are the state data in a source domain and to which a label indicating the quality of the state is added, the target state data into the data of the common space shared with the source state data. The apparatus may include a classification model for classifying, based on the data of the common space to which a label is added, the quality of the state indicated by the target state data in the common space. The apparatus may include an acquisition unit for newly acquiring target state data. The apparatus may include a determination unit for determining the quality of the state based on the classification result that is output from the classification model in response to the input of the target state data newly acquired by the acquisition unit and converted by the conversion execution unit into the data of the common space. The apparatus may include a display control unit for displaying the determination result.

A third aspect of the present invention provides a method. The method may include acquiring target state data that are the state data in a target domain and source state data that are the state data in a source domain and to which a label indicating the quality of the state is added. The method may include generating a conversion from the target state data and the source state data into the data of a common space based on the distribution of the target state data and the source state data. The method may include generating a classification model for classifying the quality of the state indicated by the target state data in the common space by using the data of the common space to which the label is added. The method may include evaluating a classification model by using the source state data converted into the data of the common space.

A fourth aspect of the present invention provides a method. The method may include converting, based on the distribution of a target state data that are the state data in a target domain and a source state data that are the state data in a source domain and to which a label indicating the quality of the state is added, the target state data into the data of the common space shared with the source state data. The method may include newly acquiring the target state data. The method may include determining the quality of the state based on the classification result that is output from the classification model in response to the target state data converted into the newly acquired data of the common space being input into the classification model for classifying the quality of the state indicated by the target state data in the common space based on the data of the common space to which the label is added. The method may include controlling the display of the determination result.

A fifth aspect of the present invention provides a computer readable medium having a program recorded thereon. The program may cause a computer to function as an acquisition unit for acquiring target state data that are the state data of a target domain and source state data that are the state data in a source domain and to which a label indicating the quality of the state is added. The program may cause the computer to function as a conversion generation unit for generating a conversion rule of the target state data and the source state data into the data of the common space based on the distribution of the target state data and the source state data. The program may cause the computer to function as a model generation unit for generating, by using the data of the common space to which the label is added, a classification model for classifying the quality of the state indicated by the target state data in the common space. The program may cause the computer to function as an evaluation unit for evaluating the classification model by using the source state data converted into the data of the common space.

A sixth aspect of the present invention provides a computer readable medium having a program recorded thereon. The program may cause the computer to function as a conversion execution unit for converting, based on the distribution of target state data that are the state data in a target domain and source state data that are the state data in a source domain and to which a label indicating the quality of the state is added, the target state data into the data of the common space shared with the source state data. The program may cause the computer to function as a classification model for classifying the quality of the state indicated by the target state data in the common space based on the data of the common space to which the label is added. The program may cause the computer to function as an acquisition unit for newly acquiring the target state data. The program may cause the computer to function as a determination unit for determining the quality of the state based on the classification result that is output from the classification model in response to the input of the target state data newly acquired by the acquisition unit and converted by the conversion execution unit into the data of the common space. The program may cause the computer to function as a display control unit for displaying the determination result.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments necessarily have to be essential to solving means of the invention.

1. First Embodiment

[1.1. Configuration of System 1]

Figure 1:
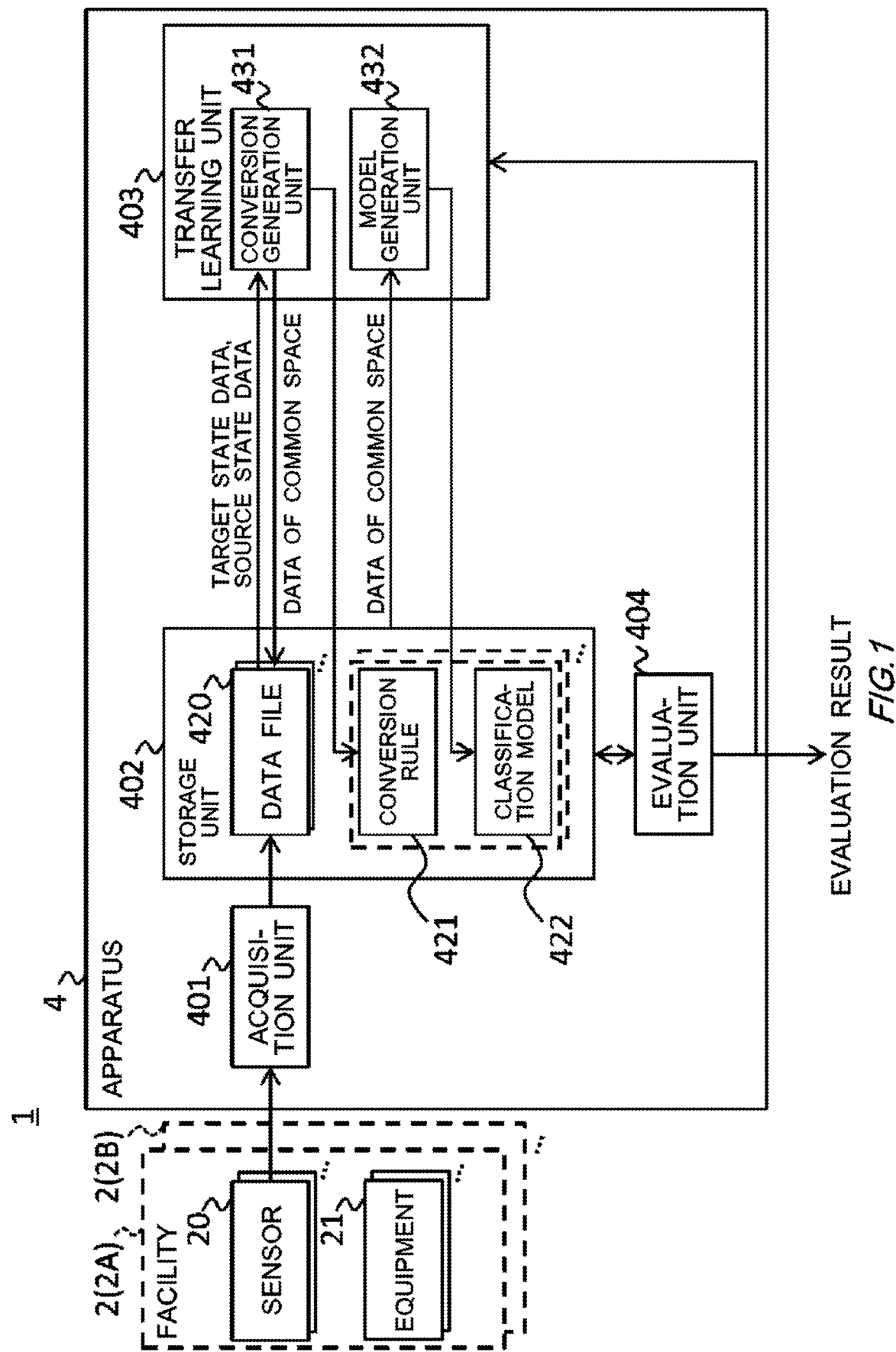
FIG. 1 shows a system 1 according to a first embodiment.

FIG. 1 illustrates a system 1 according to a first embodiment. The system 1 is used to facilitate monitoring the state of an object and includes a plurality of facilities 2, which is an example of the object and an apparatus 4.

[1.1-1. Facility 2] Each facility 2 is provided with one or more sensors 20. For example, each facility 2 may be a plant provided with a plurality of pieces of equipment 21 and may be a complex apparatus composed of the plurality of pieces of equipment 21. In this embodiment, as an example, the plurality of facilities 2 is of the same type, but it may also be of different types. A plurality of facilities 2 of the same type may be facilities located in different places as an example, but it may be facilities with different operating conditions, or may be facilities with different periods since the start of operation, in other words, facilities that are temporary different. Examples of the plant may include a plant for managing and controlling well sites such as a gas field and an oil field and surroundings thereof, a plant for managing and controlling power generation such as hydro-electric, thermo electric, and nuclear power generation, a plant for managing and controlling environmental power generation such as solar power and wind power, a plant for managing and controlling water and sewerage, a dam and the like, and the like, in addition to industrial plants such as chemical and bio industrial plants.

[1.1-1-1. Equipment 21] Each piece of equipment 21 is an instrument, a machine, or an apparatus, and may be, for example, an actuator such as a valve, a pump, a heater, a fan, a motor, or a switch that controls at least one physical quantity such as pressure, temperature, pH, speed, or flow rate in a process of the facility 2. In this embodiment, as an example, the equipment 21 is controlled from the outside in a wired or wireless manner, but may be controlled manually.

Each piece of equipment 21 provided in one facility 2 may be of different types from each other or at least a part of two or more pieces of equipment 21 may be of the same type. A plurality of pieces of equipment 21 provided in one facility 2 may be at least partially different from a plurality of pieces of equipment 21 provided in another facility 2.

[1.1-1-2. Sensor 20] Each sensor 20 measures the state of the facility 2. A sensor 20 may measure at least one physical quantity such as pressure, temperature, pH, velocity, flow rate, and the like. In addition, a sensor 20 may measure the yield of the facility 2, the proportion of impurities to be mixed, the operation status of each piece of equipment 21, and the like. Each sensor 20 may be of different types from each other, or at least some (two or more) of the sensors 20 may be of the same type. As an example, the plurality of sensors 20 may be temperature sensors provided at different locations of a furnace within the facility 2. Each sensor 20 may supply measurement data to the apparatus 4.

Each sensor 20 provided in one facility 2 may be of different types from each other, or at least some two or more sensors 20 may be of the same type. The plurality of sensors 20 provided in one facility 2 may be at least partially different from the plurality of sensors 20 provided in another facility 2.

It should be noted that the communication between a sensor 20 and the apparatus 4 may be performed according to the wireless communication protocol of, for example, ISA100.11a which is defined by International Society of Automation (ISA), and may be performed according to Highway Addressable Remote Transducer (HART) (registered trademark), Broadcast Rapid Access Intelligent Network (BRAIN) (registered trademark), FOUNDATION Fieldbus, PROFIBUS, or the like, as example.

[1.1-2. Apparatus 4] The apparatus 4 performs transfer learning to generate a classification model 422. The apparatus 4 may include an acquisition unit 401, a storage unit 402, a transfer learning unit 403, and an evaluation unit 404.

[1.1-2-1 Acquisition Unit 401] The acquisition unit 401 acquires the state data indicating the state of the facility 2. The acquisition unit 401 may acquire target state data that are the state data in a target domain, and source state data that are the state data in a source domain.

The target domain may be one facility 2 (also referred to as a facility 2A) among the plurality of facilities 2, and the target state data may include measurement data measured by at least one sensor 20 in the facility 2A in order to indicate the state of the facility 2A. In addition, the source domain may be another facility 2 (also referred to as a facility 2B) among the plurality of facilities 2, and the source state data may include the measurement data measured by at least one sensor 20 in the facility 2B in order to indicate the state of the facility 2B. The identification information of the sensor 20 that performed the measurement may be added to the measurement data in advance. It should be noted that each state data may indicate the state of the facility 2 at one moment and may include measurement data measured at one moment or within a tolerance period thereof.

The acquisition unit 401 may acquire the state data from the facility 2 and may generate a data file 420 by adding to the acquired state data the identification information (also referred to as a facility ID) of the facility 2 from which the state data is acquired. Additionally or alternatively, the acquisition unit 401 may acquire, from external equipment not shown in the figure, the data file 420 that has been created. For example, the acquisition unit 401 may acquire the target state data from the facility 2 to generate the data file 420 or may also acquire the data file 420 that includes source state data that have been created in advance. It should be noted that the facility ID may be used to identify the domain of the state data.

Herein, a label indicating the quality of the state of the facility 2B is added to the source state data. On the other hand, a label indicating the quality of the state of the facility 2A may or may not be added to the target state data. The label may be added in advance to the state data that the acquisition unit 401 acquires or may be added to the acquired state data by the acquisition unit 401 in response to the operation from the outside by an operator or the like. In this embodiment, as an example, a label indicating the quality may be added to the source state data in advance before acquisition by the acquisition unit 401.

The acquisition unit 401 may supply the acquired state data to the storage unit 402. In this embodiment, as an example, the acquisition unit 401 may supply to the storage unit 402 the data file 420 in which a facility ID is added to each state data.

[1.1-2-2. Storage Unit 402] The storage unit 402 stores various pieces of information. For example, the storage unit 402 may store at least one set of conversion rule 421 and a classification model 422, as well as a plurality of measurement data files 420 described above.

[1.1-2-2 (1) Conversion rule 421] The conversion rule 421 may be a projection, a mapping, or a function, that converts each of the target state data and the source state data into the data of the common space. The conversion rule may convert a measurement data indicated in the coordinate space (also referred to as an original coordinate space) of the target domain or the source domain into a parameter within a common space different from these coordinate spaces. The dimension number of the common space may or may not be the same as the dimension number of the original coordinate spaces. For example, each parameter of the common space may be represented as the total sum of products of various measurement values of the original coordinate space and weighting factors (also referred to as contribution ratio), and may be a principal component score in a case where a principal component analysis is performed on various measurement values of the original coordinate space, as an example. The conversion rule 421 may be generated by the transfer learning unit 403 and stored in the storage unit 402.

[1.1-2-2 (2). Classification model 422] The classification model 422 classifies the quality of the state indicated by the target state data in the common space based on the data of the common space to which a label is added. The classification model 422 may classify the quality of the state indicated by the source state data in the common space. For example, the classification model 422 may classify the quality of the state indicated by the source state data or target state data that are converted by a corresponding conversion rule 421 into the data of the common space.

The classification model 422 may output the state index value indicating the quality of the state in response to the input of the target state data or source state data converted into the data of the common space. The state index value may be binarized such that one value indicates that the state is good and the other is the value indicating that the state is poor, or may be a value that is not binarized. For example, the classification model 422 may be learned by using a binarized value consisting of the value indicating the good state of the facility 2 and the value indicating the poor state of the facility 2, and may output the state index value of pre-binarization through the comparison to a threshold. The classification model 422 may be a support-vector machine, as an example, or may be a model learned through another algorithm such as logistic regression, decision tree, or neural network. The classification model 422 may be generated by the transfer learning unit 403 and stored in the storage unit 402.

[1.1-2-3. Transfer Learning Unit 403] The transfer learning unit 403 performs transfer learning and includes a conversion generation unit 431 and a model generation unit 432.

[1.1-2-3 (1) Conversion Generation Unit 431] The conversion generation unit 431 generates the conversion rule 421 based on the distribution of the target state data and the source state data. The conversion generation unit 431 may generate the conversion rule 421 such that the distribution of the target state data converted into the data of the common space approximates to that of the converted source state data and the variance of each of the distributions is maximized. This minimizes the information loss in a case where the conversion rule 421 is used to convert the target state data and the source state data into the data of the common space. For example, the conversion generation unit 431 may generate the conversion rule 421 with a conventionally known approach such as Transfer Component Analysis (TCA) and Semi-supervised TCA (SSTCA).

The conversion generation unit 431 may store the generated conversion rule 421 in the storage unit 402. In addition, the conversion generation unit 431 may store in the storage unit 402 the data files 420 of the target state data and source state data converted into the data of the common space in the generation process of the conversion rule 421. The conversion generation unit 431 may supply the converted data files 420 to the model generation unit 432.

[1.1-2-3 (2) Model Generation Unit 432] The model generation unit 432 generates the classification model 422 using the data of the common space that has a label indicating the quality of the state associated to it.

For example, the model generation unit 432 may generate the classification model 422 using the source state data converted into the data of the common space. If a label is added to the target state data, the model generation unit 432 may generate the classification model 422 further using the target state data converted into the data of the common space.

If the data files 420 of the state data converted into the data of the common space are stored in the storage unit 402 or supplied from the conversion generation unit 431, the model generation unit 432 may use the data files 420 to generate the classification model 422. If the data files 420 of the state data converted into the data of the common space are not stored in the storage unit 402 and is not supplied from the conversion generation unit 431, the model generation unit 432 may read any state data to be used for generating the classification model 422 from the memory section 402, generate the data of the common space using the conversion rule 421, and use it to generate the classification model 422.

The model generation unit 432 may generate the classification model 422 such that the correlation is high between the state index values in a case where the data of the common space is input into the classification model 422 and the quality indicated by the labels. The model generation unit 432 may store the generated classification model 422 in the storage unit 402 in association with the conversion rule 421 used for generating the data of the common space.

[1.1-2-4. Evaluation Unit 404] The evaluation unit 404 evaluates the classification model 422 using the source state data converted into the data of the common space. In response to the source state data converted into the data of the common space being input into the classification model 422, the evaluation unit 404 may evaluate the accuracy of the classification model 422 based on the correlation between the state index values that are output from the classification model 422 and the quality indicated by the labels of the source state data.

If the data files 420 of the source state data converted into the data of the common space are stored in the storage unit 402, the evaluation unit 404 may read and use the data files 420 for evaluation. If the data files 420 of the source state data converted into the data of the common space are not stored in the storage unit 402, the evaluation unit 404 may read any source state data to be used for evaluation from the memory section 402, generate the data of the common space using the conversion rule 421, and use it for evaluation.

The evaluation unit 404 may determine whether the evaluation of the classification model 422 is higher than a reference. For example, the evaluation unit 404 may determine whether the evaluation index value of the classification model 422 is higher than a reference value. For the evaluation index value, metrics such as Accuracy, Precision, Recall, ROC, or the like can be used. The reference value of the evaluation index value for one classification model 422 may be the evaluation index value of another classification model 422 that has been already created by the apparatus 4 or may be any value that is set by an operator.

The evaluation unit 404 may output the evaluation result to the transfer learning unit 403 or a display unit not shown in the figure. If the evaluation unit 404 determines whether the evaluation of the classification model 422 is higher than a reference, it may output the determined result as an evaluation result.

According to the apparatus 4 in the system 1 described above, based on the distribution of the target state data and source state data, the conversion rule 421 that converts the target state data and source state data into the data of the common space is generated, and the classification model 422 is generated to classify the quality of the state indicated by the target state data in the common space using the data of the common space to which the label is added. Therefore, even if there are few target state data in the target domain, the classification model 422 can be generated by using the data to which the label is added (as an example, the source state data) among the data of the common space. In addition, because the classification model 422 is evaluated using the source state data converted into the data of the common space, the classification model 422 can be generated with a good accuracy in classification.

In addition, because the conversion rule 421 is generated such that the distribution of the converted target state data approximates to that of the converted source state data and the variance of each distribution is maximized, the information loss is minimized in a case where the target state data and source state data are converted into the data of the common space using the conversion rule 421. Therefore, unlike the case where a lot of information is lost due to the conversion into the data of the common space, the source state data and the target state data can be classified with a high accuracy in the common classification model 422.

[1.2. Operation of Apparatus 4]

Figure 2:
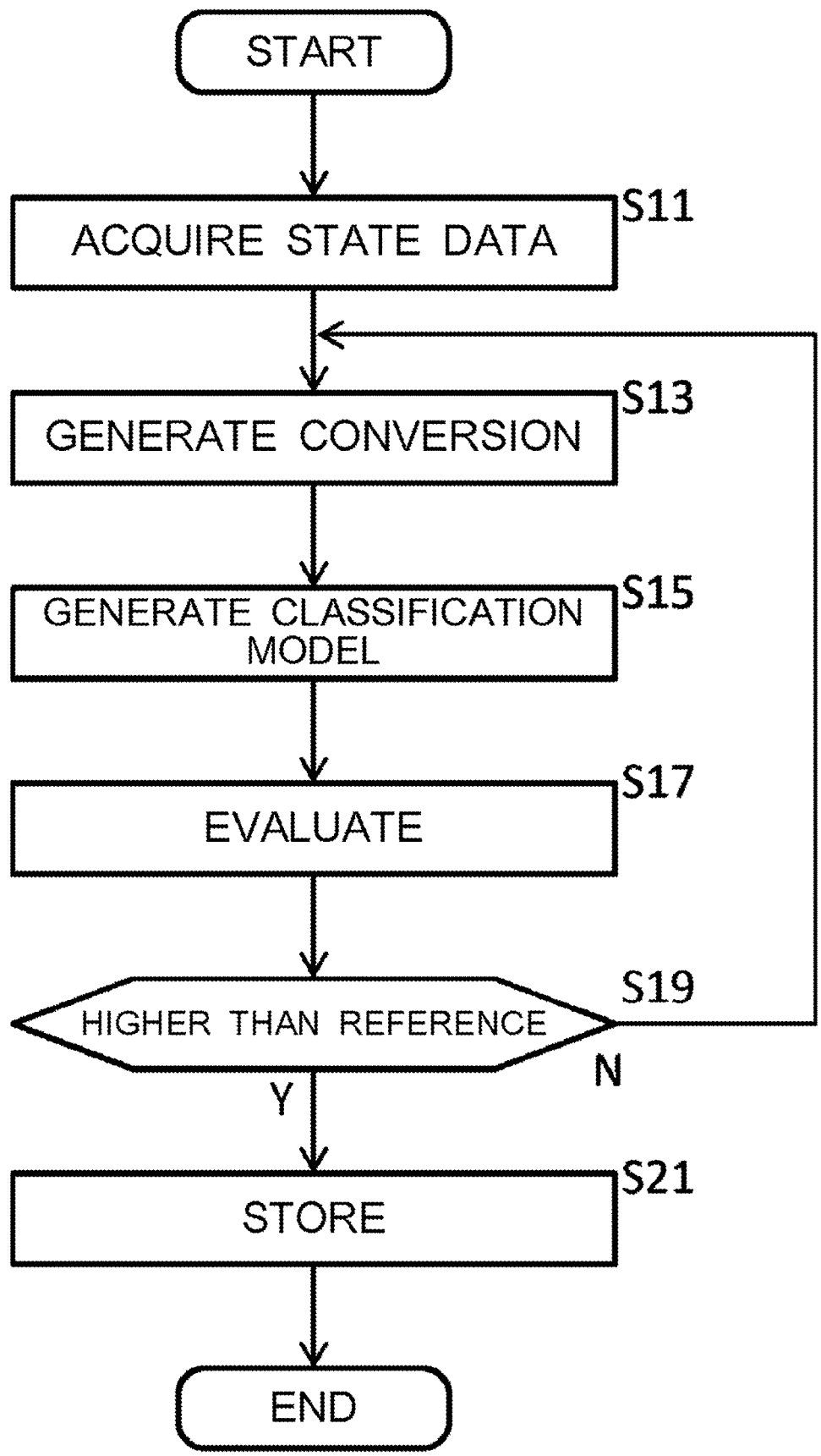
FIG. 2 shows an operation of the apparatus 4.

FIG. 2 shows an operation of the apparatus 4. The apparatus 4 performs the processes of step S11 to S21 to generate the classification model 422.

In step S11, the acquisition unit 401 acquires the state data. For each of the source state data and the target state data, the acquisition unit 401 may acquire the state data indicating the good state and the state data indicating the poor state of the facilities 2.

For example, the acquisition unit 401 may acquire the source state data corresponding to the good state and the source state data corresponding to the poor state in a pre-specified ratio based on the label indicating the quality that is added to the source state data. As an example, the acquisition unit 401 may acquire the source state data such that the ratio of the good source state data and the poor source state data is 8:2 or 9:1. The acquisition unit 401 may refer to the data files 420 of the source state data that have been already acquired and stored in the storage unit 402 to adjust the number of the source state data to be newly acquired. If there are few poor source state data in the storage unit 402, the acquisition unit 401 may adjust the ratio by reducing the good source state data to be newly acquired. The ratio may be specified from the outside by an operator or the like.

Alternatively or additionally, the acquisition unit 401 may further acquire the state data that is outside the distribution range of the already acquired target state data as the target state data (also referred to as the target state data outside the distribution range) for generating the conversion rule 421. For example, the acquisition unit 401 may refer to the data files 420 of each target state data stored in the storage unit 402 to identify the distribution range of the measurement value for each type of the measurement data included in the target state data. For at least one type of the measurement data, the acquisition unit 401 may randomly generate new target state data having the measurement value outside the identified distribution range and acquire it as the target state data outside the distribution range. The acquisition unit 401 may acquire only one piece or several pieces of target state data outside the distribution range. In response to receiving the instruction for adding the target state data from the outside of the distribution range by an operator or the like, the acquisition unit 401 may acquire the target state data outside the distribution range. It should be noted that the already acquired target state data may be target state data corresponding to the good state and the target state data outside the distribution range may be the target state data expected to correspond to the poor state. The target state data having the measurement value outside the distribution range may be generated outside by an operator or the like and supplied to the acquisition unit 401.

In step S13, the conversion generation unit 431 generates the conversion rule 421 based on the distribution of the target state data and the source state data. The conversion generation unit 431 may generate the conversion rule 421 by using the first source state data among all the source state data together with the target state data. As an example, the first source state data may be the source state data that are 70 to 80% of all the source state data. The conversion generation unit 431 may randomly select the first source state data and segregate it from the rest of the source state data that will be known as the second source state data.

In step S15, the model generation unit 432 generates the classification model 422 by using the data of the common space to which a label is added. For example, the model generation unit 432 may generate the classification model 422 by using the first source state data used for generating the conversion rule 421.

In step S17, the evaluation unit 404 evaluates the classification model 422 by using the source state data converted into the data of the common space. The evaluation unit 404 may perform the evaluation by using second source state data different from the first source state data used by the conversion generation unit 431 for generating the conversion 421. The second source state data may be the source state data that are 20 to 30% of all the source state data as an example.

In step S19, the evaluation unit 404 determines whether the evaluation of the classification model 422 is higher than the reference. If it is determined that the evaluation of the classification model 422 is not higher than the reference (step S19: No), the process may proceed to step S13 described above. In step S19, if it is determined that the evaluation of the classification model 422 is higher than the reference (step S19: Yes), the process may proceed to step S21.

In step S21, the storage unit 402 stores the generated conversion rule 421 and classification model 422 that are associated with each other. When the process of step S21 ends, the apparatus 4 may end the operation.

According to the operation described above, because the classification model 422 is generated by using the first source state data and the classification model 422 is evaluated by using the second source state data, the evaluation of the classification model 422 can be performed with a high accuracy.

In addition, because the source state data corresponding to the good state and the source state data corresponding to the poor state are acquired in the specified ratio based on the label added to the source state data, the conversion rule 421 can be prevented from being generated with a source state data in which there is an excessive bias toward the good state or the poor state.

In addition, because the state data that is outside the distribution range of the already acquired target state data is further acquired as the target state data for generating the conversion rule 421, the target state data corresponding to one state and the target state data corresponding to another state are obtained. Thus, the target state data corresponding to the poor state is acquired in a case where the amount of the target state data corresponding to the good state is larger than the amount of the target state data corresponding to the poor state (as an example, a case where there is only target state data corresponding to the good state). In this way, the conversion rule 421 can be prevented from being generated with the target state data in which there is an excessive bias toward the good state.

[1.3. Conversion into Common Space]

Figure 3:
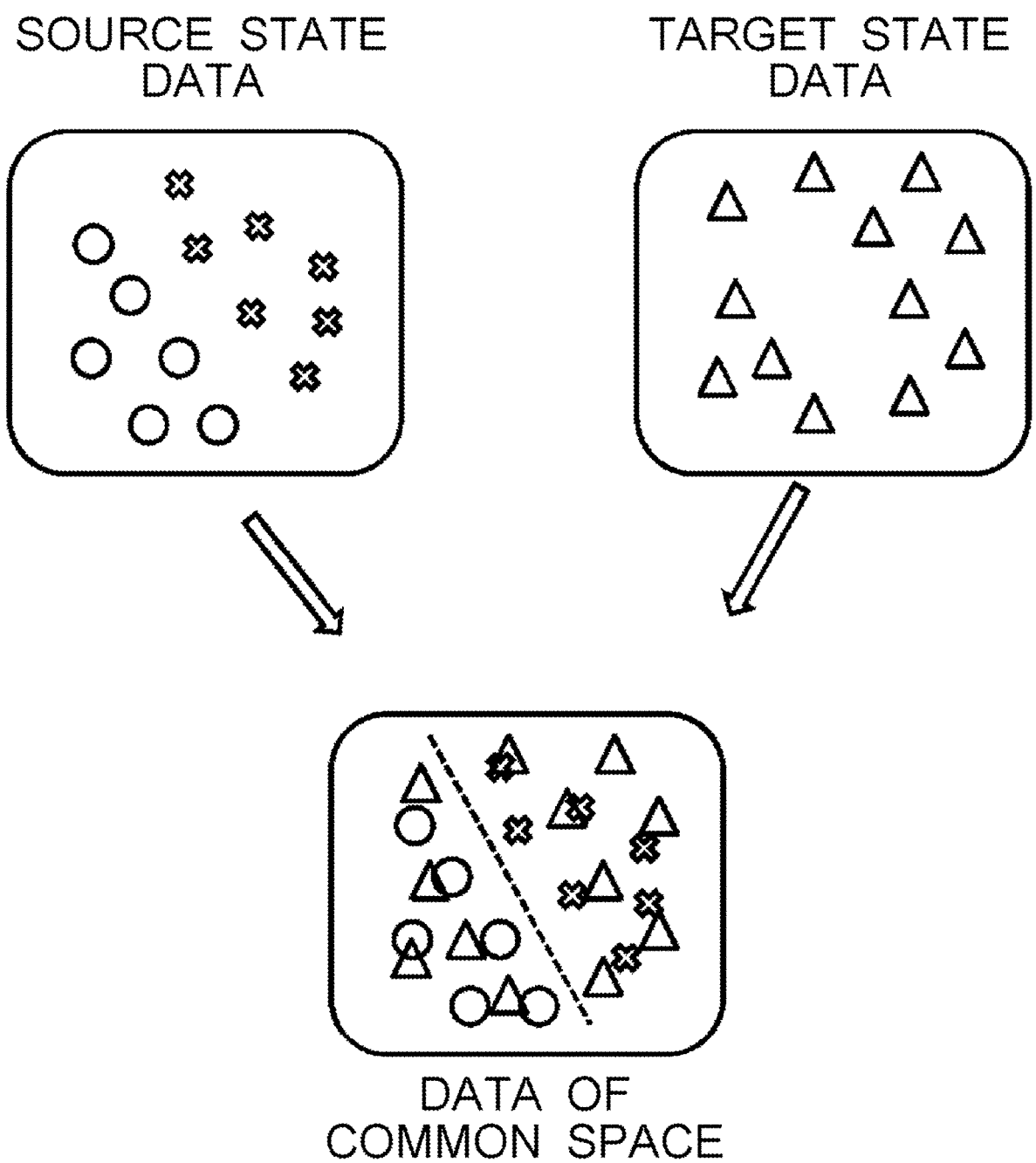
FIG. 3 schematically shows a conversion rule of the state data into the data of the common space.

FIG. 3 schematically shows the conversion rule of the state data into the data of the common space.

In the frame of the source state data in the figure, each source state data to which the label of the good state is added is indicated as the plot of circular shapes, and each source state data to which the label of the poor state is added is indicated as the plot of cross shapes. In addition, in the frame of the target state data, each target state data whose quality is unknown is indicated as the plot of triangle shapes. In addition, in the frame of the common space, each state data converted into the data of the common space is indicated as the plot with the same shape as the original plot.

As indicated with a broken line in the frame of the common space in the figure, the source state data to which the label of the good state is added and the source state data to which the label of the poor state is added are distributed such that they can be classified in the common space. In this way, by learning the classification rule of the data in the common space to which a label is added, the classification model 422 that classifies the quality of the state indicated by the target state data can be generated.

2. Second Embodiment

[2.1. Configuration of Apparatus 4A]

Figure 4:
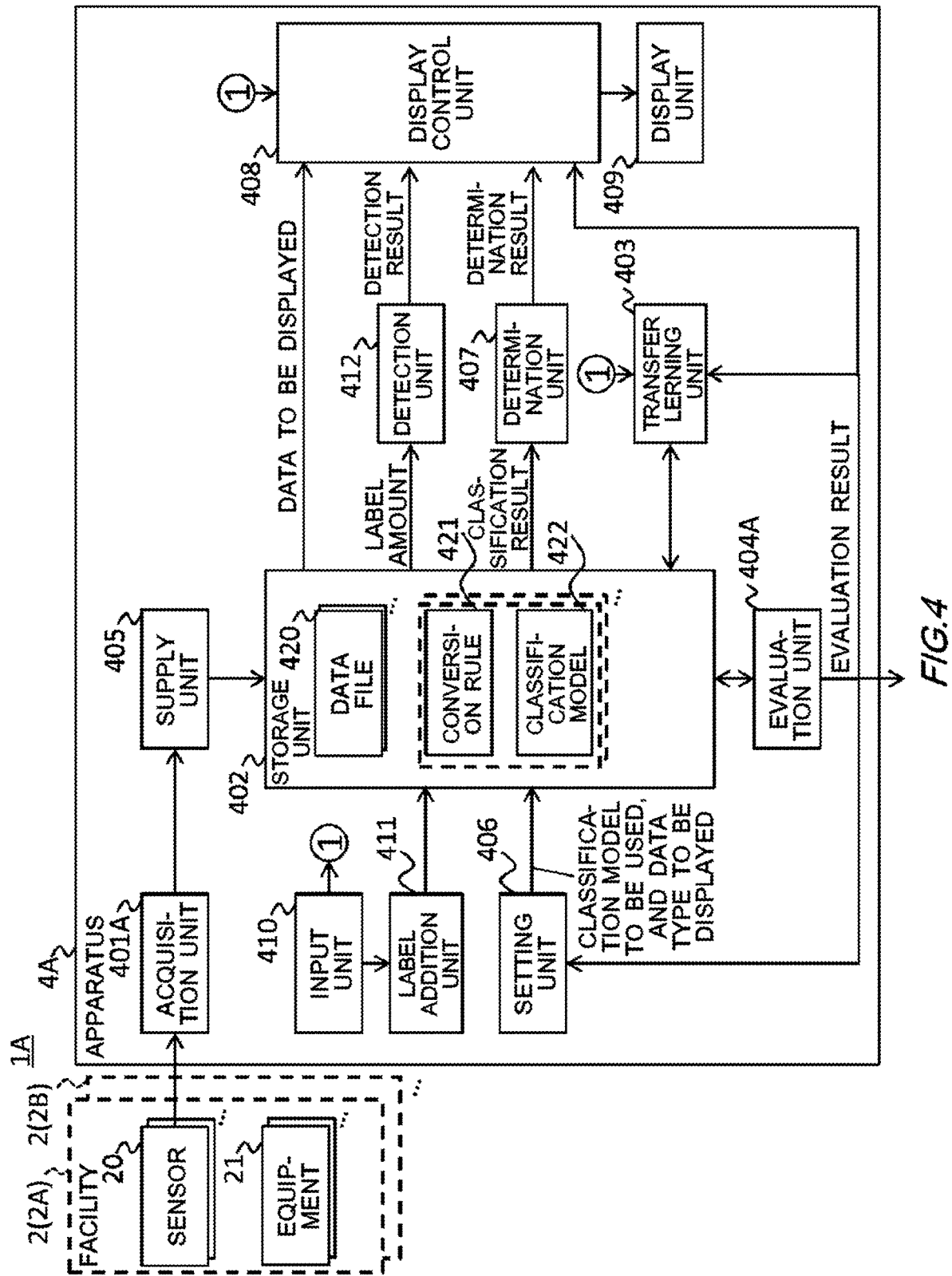
FIG. 4 shows an apparatus 4A according to a second embodiment.

FIG. 4 shows an apparatus 4A according to the second embodiment. It should be noted that, in the apparatus 4A according to this embodiment, the configuration that is the same or approximately the same as that of the apparatus 4 shown in FIG. 1 are given the same sign and the description is omitted.

The apparatus 4A determines the quality of the state using the generated classification model 422. The apparatus 4A includes the storage unit 402 and the transfer learning unit 403 described above as well as an acquisition unit 401A, a supply unit 405, and the evaluation unit 404A, a setting unit 406, a determination unit 407, a display control unit 408, a display unit 409, an input unit 410, a label addition unit 411, and a detection unit 412.

[2.1-1. Acquisition Unit 401A] As in the case of the acquisition unit 401 in the first embodiment described above, the acquisition unit 401A may acquire the target state data and source state data that are used by the transfer learning unit 403 to generate the conversion rule 421 and the classification model 422, and store them in the data files 420 in the storage unit 402.

Alternatively or additionally, the acquisition unit 401A newly acquires the target state data. The acquisition unit 401A may sequentially acquire the newly measured target state data from the facility 2A. The acquisition unit 401A may supply the acquired target state data to the supply unit 405. In addition, as in the case of the acquisition unit 401 in the first embodiment, the acquisition unit 401A may generate the data files 420 by adding the facility ID to newly acquired target state data, and store it in the storage unit 402.

In addition, the acquisition unit 401A may add a measurement time and the identification information of the sensor 20 that performed the measurement to the target state data, which is then recorded in the storage unit 402. The measurement time of the measurement data may be the time at which the measurement data was measured, and may indicated the elapsed time since the start time of the process that is performed in the facility 2A. The measurement time of the measurement data may be the time at which the measurement data was acquired by the acquisition unit 401A. It should be noted that the measurement time and the identification information of the sensor 20 may be added in advance to the measurement data that is supplied from the sensor 20.

[2.1-2. Supply Unit 405] The supply unit 405 supplies the data to be classified to the classification model 422. The supply unit 405 may be an example of the conversion execution unit and converts the target state data into the data of the common space shared with the source state data based on the distribution of the target state data and the source state data to which the label is added. The supply unit 405 may convert the newly acquired target state data into the data of the common space using the conversion rule 421 and supply it to the classification model 422. In response to the target state data being acquired by the acquisition unit 401A, the supply unit 405 may sequentially supply the data of the common space to the classification model 422. If there is a difference among the measurement times added to each measurement data of the target state data, the supply unit 405 may make the measurement time to be added the same.

[2.1-3. Evaluation Unit 404A] The evaluation unit 404A evaluates the classification model 422 using the source state data converted into the data of the common space. The evaluation unit 404A may perform the process in the same manner as the evaluation unit 404 in the first embodiment described above, and may output the evaluation result to the display control unit 408 and the setting unit 406.

[2.1-4. Setting Unit 406] The setting unit 406 sets the classification model 422 as the classification model 422 used for classifying the target state data (also referred to as the classification model 422 to be used) in response to the evaluation of the classification model 422 being higher than a reference. The setting unit 406 may set the conversion rule 421 corresponding to the classification model 422 to be used, as the conversion rule 421 used for converting the target state data (also referred to as the conversion rule 421 to be used). The setting unit 406 may perform the setting based on the evaluation result by the evaluation unit 404A.

In addition, the setting unit 406 may set, as parameters to be displayed, at least one parameter whose influence on the classification result of the classification model 422 is greater than a reference degree among a plurality of parameters included in the data of the common space. For example, the setting unit 406 may set, as parameters to be displayed, a reference number of parameters (in this embodiment, three as an example) whose degree of influence on the state index value that is output from the classification model 422 to be used is the greatest among several types of parameters. In this case, the setting unit 406 may set, as the reference degree, the degree of influence that is the reference number+$1^{st}$ greatest among degrees of influence of each parameter.

It should be noted that the degree of influence of each type of parameters on the state index value that is output from the classification model 422 may be calculated with a conventional known approach, for example, Permutation Importance, LIME, or the like. The setting unit 406 may add, to the parameter of the parameter to be displayed among each type of parameters in the storage unit 402, a tag indicating it is the parameter to be displayed. As an example, if the reference number is 2 and the degree of influence of each parameter is "0.8", "0.6", "0.5", . . . in order of magnitude, the third (=reference number+1) degree of influence "0.5" is set as the reference degree.

For each type of parameters, the setting unit 406 may calculate the degree of influence on the state index value and set the parameter to be displayed. Alternatively, the setting unit 406 may set, as the parameter to be displayed, the parameter specified by the operator via the input unit 410.

In addition, the setting unit 406 may set, as the measurement value to be displayed, at least one measurement value whose influence on the classification result of the classification model 422 to be used is greater than a reference degree among several types of measurement values included in the target state data. For example, the setting unit 406 may set, as the measurement value to be displayed, the reference number of the measurement values (in this embodiment, three as an example) whose degree of influence on the state index value that is output from the classification model 422 to be used is the greatest among several types of measurement values. In this case, the setting unit 406 may set, as the reference degree, the degree of influence that is the reference number+1st greatest among degrees of influence of each measurement value.

Herein, because the classification model 422 performs classification based on the data of the common space, it is difficult to directly calculate how much various kinds of the measurement values included in the target state data have an influence on the classification result. Therefore, in this embodiment, as an example, by utilizing the fact that a parameter of the common space is represented as the total sum of the product of the various measurement values of the coordinate space of the target state data (also referred to as the original coordinate space) and the weighting factors, the degree of influence of the measurement values of the original coordinate space on the classification result is determined based on the magnitude of the weighting factor for each type of the measurement value.

For example, the degree of influence of one type of the measurement value included in the target state data may be the summation of the weighting factor for the one type of the measurement value included in the calculation formula of each parameter of the common space.

As an example, each parameter $P_n$ of the common space (note that the subscript 'n' is any natural number and indicates the identification number of the parameter) may be indicated as formula (1) by using various measurement values "a", "b", "c", . . . in the target state data and the weighting factors $W_a^{(n)}$, $W_b^{(n)}$, $W_c^{(n)}$ for each measurement value. It should be noted that the subscript of the weighting factor $W_a^{(n)}$ or the like indicates the corresponding type of a measurement value, and the superscript indicates the identification number of the corresponding parameter.

$$P_n = W_a^{(n)} \cdot a + W_b^{(n)} \cdot b + W_c^{(n)} \cdot c + \ldots \quad (1)$$

In this case, the degree of influence $l_a$ of the measurement value "a" may be calculated in the formula (2).

$$I_a = W_a^{(1)} + W_a^{(2)} + W_a^{(3)} + \ldots \quad (2)$$

Alternatively, the degree of influence of one type of the measurement value included in the target state data may be the summation of the weighting factors for the one type of measurement value included in the calculation formula (as an example, the parameter to be displayed) of at least one parameter whose influence on the classification result of the classification model 422 is greater than all the other parameters of the common space. As an example, if the parameter to be displayed includes two parameters: $P_1$ and $P_3$, the degree of influence $I_a$ of the measurement value "a" may be indicated in the formula (3).

$$I_a = W_a^{(1)} + W_a^{(3)} \quad (3)$$

For each type of measurement value, the setting unit 406 may calculate the degree of influence on the state index value and set the measurement value to be displayed. Alternatively, the setting unit 406 may set, as the measurement value to be displayed, the measurement value specified by the operator via the input unit 410.

[2.1-5. Determination Unit 407] In response to the input of the newly acquired target state data converted into the data of the common space, the determination unit 407 determines the quality of the state based on the classification result that is output from the classification model 422 (in this embodiment, the state index value as an example). For example, if the classification result that is not binarized is output from the classification model 422, the determination unit 407 may perform the determination by comparing the classification result or the moving average thereof to the determination threshold. If the classification result that is binarized is output from the classification model 422, the determination unit 407 may perform the determination by comparing the moving average of the classification result to the determination threshold, or may use the classification result itself as the determination result. The determination unit 407 may supply the determination result to the display control unit 408. If the determination unit 407 performs the determination through the comparison using the determination threshold, it may supply the comparison result, the determination threshold, and the object to be compared (as an example, the classification result through the classification model 422) to the display control unit 408 as the determination result.

[2.1-6. Input Unit 410] The input unit 410 receives the input of the operation from the operator. In this embodiment, as an example, in a case where the measurement data is displayed, the input unit 410 may receive the operation for adding the label indicating the quality of the state of the facility 2A to the measurement data. In response to the operation of adding the label being performed, the input unit 410 may supply the signal indicating that fact to the label addition unit 411.

In a case where the measurement data is displayed in the display unit 409, the input unit 410 may also receive the operation for switching the object to be displayed between the measurement value to be displayed and the parameter to be displayed. In response to the switching operation being performed, the input unit 410 may supply the signal indicating that fact to the display control unit 408.

The input unit 410 may also receive the operation for generating the classification model 422 again. In response to the generation of the classification model 422 being indicated, the input unit 410 may supply the signal indicating that fact to the transfer learning unit 403.

[2.1-7. Display Control Unit 408] The display control unit 408 controls the display unit 409. The display control unit 408 may display the determination result from the determination unit 407.

In response to the operation by the operator, the display control unit 408 may also alternatively switch the measurement value to be displayed among the measurement values of the target state data newly acquired by the acquisition unit 401A and the value of the parameter to be displayed among the parameters of the common space into which the target state data newly acquired by the acquisition unit 401A is converted, and display it together with the determination result.

The display control unit 408 may display only one value or a plurality of values for each type of the measurement value to be displayed or the parameter to be displayed. If the display control unit 408 displays only one value for one type of the measurement value to be displayed or the parameter to be displayed, it may also display the value at one moment (as one example, the latest value) or may display the moving average value of the values at a plurality of moments (as one example, the moving average value for the most recent period). If the display control unit 408 displays a plurality of values for one type of the measurement value to be displayed or the parameter to be displayed, it may display the transition of the values at a plurality of moments that are most recent.

In addition, the display control unit 408 may further display the state index values at one moment that is output from the classification model 422 (as an example, the newest state index value) or may display the state index values at a plurality of moments. If the display control unit 408 displays the state index value at a plurality of moments, it may display the transition of the state index values that are output from the classification model 422 at a plurality of moments that are most recent.

[2.1-8. Display Unit 409] The display unit 409 performs the display according to the control from the display control unit 408. It should be noted that, in this embodiment, as an example, the display unit 409 is incorporated in the apparatus 4A, but it may be externally connected to the apparatus 4A.

[2.1-9. Label Addition Unit 411] In response to the operation by the operator, the label addition unit 411 adds the label indicating the quality of the state of the facility 2A to the target state data. The label addition unit 411 may add the label indicating the good state or the poor state to the measurement data in the storage unit 402.

[2.1-10. Detection Unit 412] The detection unit 412 detects that the target state data to which a label is added by the label addition unit 411 reaches a reference amount. The detection unit 412 may supply the detection result to the display control unit 408. In this embodiment, as an example, the detection unit 412 supplies to the display control unit 408 the detection result indicating the fact that the target state data to which a label is added has reached the reference amount, and displays the message indicating the fact.

The reference amount may be set based on the amount with which the conversion rule 421 and the classification model 422 can be generated using the target state data to which a label is added and the source state data. As an example, the reference amount may be the amount obtained by subtracting the label amount of the source state data from the smallest label amount with which the conversion rule 421 and the classification model 422 can be generated.

According to the apparatus 4A described above, in response to the evaluation of the classification model 422 being higher than the reference, the classification model 422 is set as the classification model 422 to be used. Then, the quality of the state if determined based on the classification result that is output from the classification model 422 to be used according to the input of the target state data that is newly acquired and converted into the data of the common space. Therefore, the state corresponding to the target state data can be determined according to the classification model 422 with a high accuracy.

In addition, the display is switched between the measurement value to be displayed whose influence on the classification result of the classification model 422 is great among the measurement values of the newly acquired target state data and the value of the parameter to be displayed whose influence on the classification result of the classification model 422 is great among the parameters of the common space into which the newly acquired target state data is converted. Therefore, when the state is poor, the measurement value to be displayed is displayed so that the cause of the poor state can be easily identified. In addition, when the accuracy of the determination result is poor, the value of the parameter to be displayed is displayed so that the debug of the classification model 422 can be easily performed. In addition, the display is alternatively switched between the measurement value to be displayed and the value of the parameter to be displayed. This prevents the value of the parameter to be displayed from being displayed for a user who wants to see the measurement value to be displayed to identify the cause of the poor state or prevents the measurement value to be displayed from being displayed for a user who wants to see the parameter to be displayed to perform the debug of the classification model 422. As a result, the displayed contents can be prevented from being complex in comparison with a case where the measurement value to be displayed and the value of the parameter to be displayed are displayed together.

In addition, because a label is added to the target state data by the operator, the learning of the classification model 422 can be performed by using the target state data to which a label is added.

In addition, because the message indicating that the target state data to which a label is added has reached the reference amount is displayed, the classification model 422 can efficiently be generated again.

Figure 5:
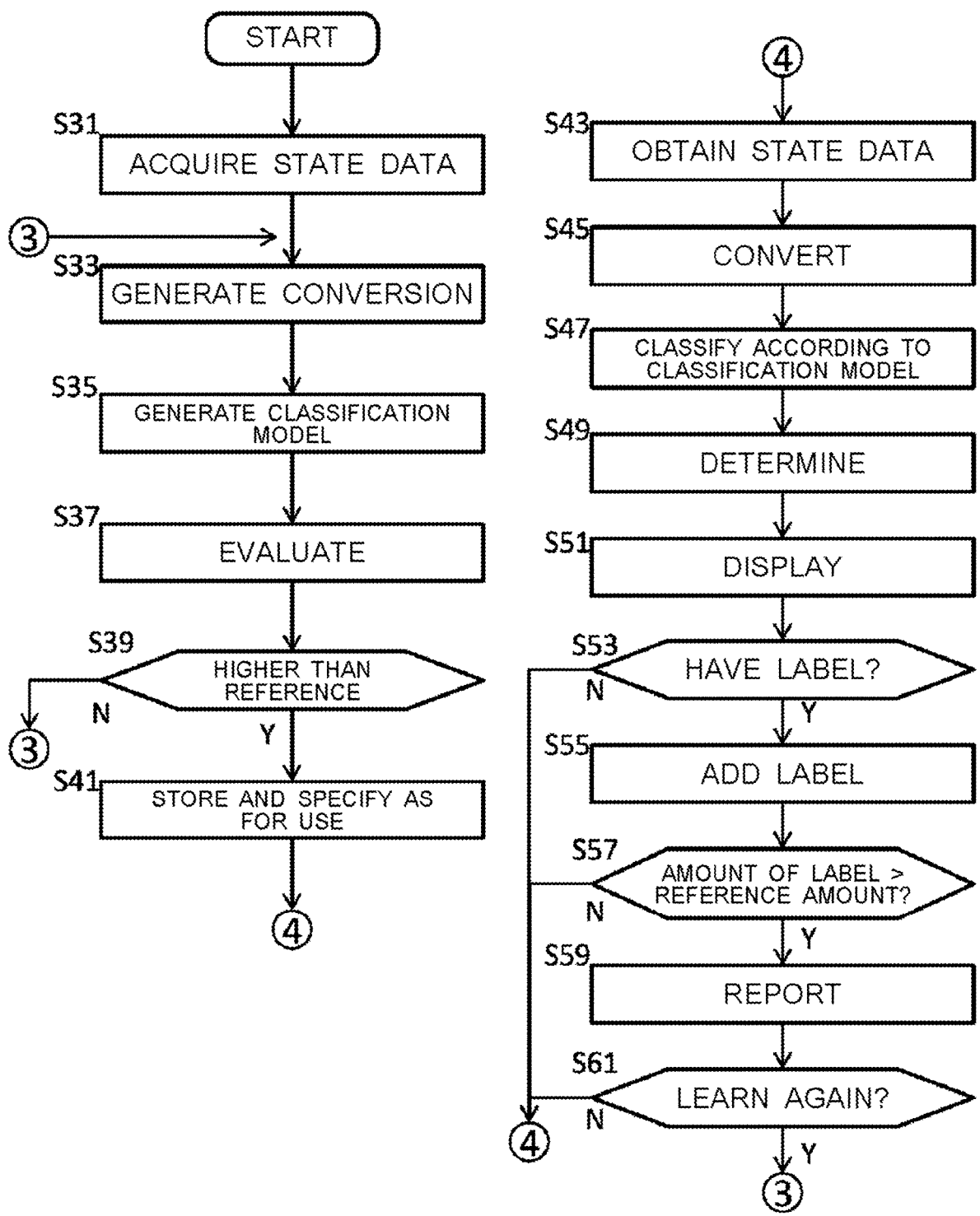
FIG. 5 shows an operation of the apparatus 4A.

[2.2. Operation] FIG. 5 shows the operation of the apparatus 4A.

The apparatus 4A monitors the state of the facility 2A by performing the process of step S31 to S61.

In step S31 to S37, as in the case of step S11 to S17 described above, the apparatus 4A generates the conversion rule 421 and the classification model 422 by using the source state data and the target state data and evaluates the generated classification model 422.

In step S39, the evaluation unit 404A determines whether the evaluation of the classification model 422 is higher than the reference. If it is determined that the evaluation of the classification model 422 is not higher than the reference (step S39: No), the process may proceed to step S33 described above. In step S39, if it is determined that the evaluation of the classification model 422 is higher than the reference (step S39: Yes), the process may proceed to step S41.

In step S41, the storage unit 402 stores the conversion rule 421 and the classification model 422 that are associated with each other and the setting unit 406 sets the classification model 422 as the object to be used. Furthermore, the setting unit 406 may set the parameter to be displayed among a plurality of parameters included in the data of the common space and set the measurement value to be displayed among several types of measurement values included in the target state data.

In step S43, the acquisition unit 401A acquires the target state data from the facility 2A. The acquisition unit 401A may sequentially acquire the target state data that is newly measured in the facility 2A.

In step S45, the supply unit 405 converts the newly acquired target state data into the data of the common space through the conversion rule 421. The supply unit 405 may store the data file 420 of the converted target state data in the storage unit 402.

In step S47, the supply unit 405 inputs the data of the common space into the classification model 422 set as the object to be used, and causes the classification model 422 to perform the classification. In step S49, the determination unit 407 determines the quality of the state based on the classification result that is output from the classification model 422.

In step S51, the display control unit 408 displays the determination result from the determination unit 407. If the determination unit 407 performs the determination through the comparison using the determination threshold, the display control unit 408 may display, as the determination result, the comparison result, the determination threshold, and the object of comparison (as an example, the classification result of the classification model 422).

In response to an operation by the operator, the display control unit 408 may display, together with the determination result, any of the measurement value to be displayed among the measurement values of the newly acquired target state data and the value of the parameter to be displayed among parameters of the common space into which the newly acquired target state data is converted. The display control unit 408 may read and display the measurement value to be displayed that is set by the setting unit 406 in advance as an object to be displayed among various measurement values in the target state data stored in the storage unit 402. In addition, the display control unit 408 may read and display the parameter to be displayed that is set by the setting unit 406 in advance as an object to be displayed among parameters of the common space stored in the storage unit 402.

In step S53, the label addition unit 411 determines whether the operation for adding the label indicating the quality of the state to the target state data is performed. If it determines that the operation has not been performed (step S53; No), the process may proceed to step S43. If it determines that the operation has been performed (step S53; Yes), the process may proceed to step S55.

In step S55, the label addition unit 411 adds the label indicating the quality of the state to the target state data measured at a moment specified by an operator. The specified moment may be the current moment, or may be the moment at which the measurement data corresponding to the measurement value to be displayed or state index value that is being displayed is measured. In addition, the specified moment may be one moment or may be several moments that are continuous or discontinuous.

For example, if any measurement value to be displayed that is being displayed is specified by an operator via the input unit 410, the label addition unit 411 may identify the measurement time of the specified measurement value to be displayed as the specified moment. In addition, if any parameter to be displayed that is being displayed is specified by an operator via the input unit 410, the label addition unit 411 may identify, as the specified moment, the measurement time of the measurement value that is the source of the specified parameter to be displayed. In addition, if any state index value that is output from the classification model 422 and is being displayed is specified by the operator via the input unit 410, the label addition unit 411 may identify the measurement time of the target state data corresponding to the specified state index value as the specified moment.

In response to the operation indicating that the state of the facility 2A is good is performed on the input unit 410, the label addition unit 411 may add the label indicating that fact to the target state data. Similarly, in response to the operation indicating that the state of the facility 2A is poor is performed on the input unit 410, the label addition unit 411 may add the label indicating that fact to the target state data.

In step S57, the detection unit 412 determines whether the target state data to which the label is added by the label addition unit 411 has reached the reference amount. If it is determined that the reference amount has not been reached (step S57: No), the process may proceed to step S43. If it is determined that the reference amount has reached (step S57; Yes), the process may proceed to step S59.

In step S59, the detection unit 412 causes the display unit 409 to display, via the display control unit 408, the message indicating that the target state data to which the label is added by the label addition unit 411 has reached the reference amount. The display message may include the message for selecting whether to generate the classification model 422 again.

In step S61, the transfer learning unit 403 determines whether the operation for generating the classification model 422 again has been performed. If it is determined that the operation has not been performed (step S61; No), the process may proceed to step S43. If it is determined that the operation has been performed (step S61; Yes), the process may proceed to step S31. In this way, the classification model 422 is generated using the target state data that is newly acquired and to which the label is added.

According to the operation described above, because the label is added to the target state data that is measured at the moment specified by the operator, the label can be easily added.

[2.3. Example of Operation]

Figure 6:
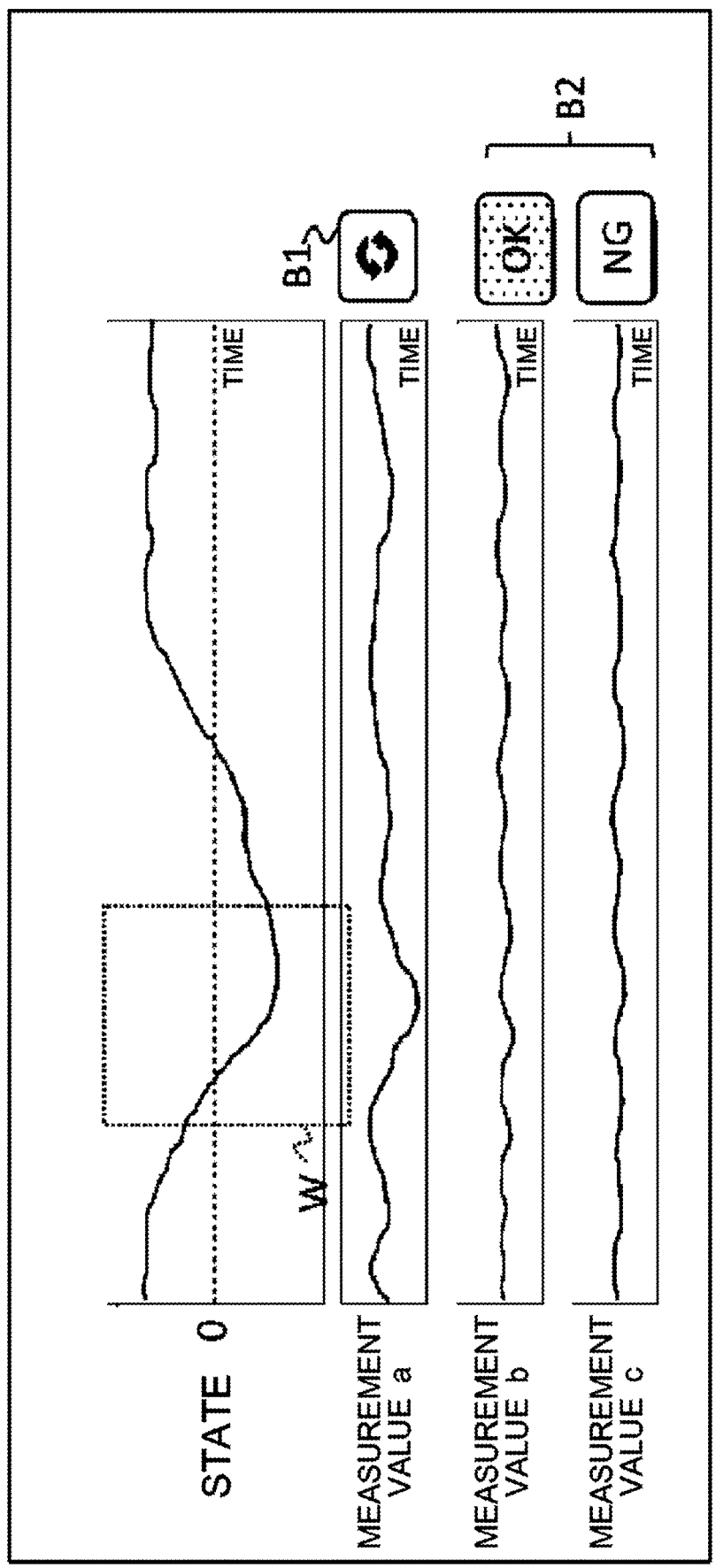
FIG. 6 shows an example of a display screen.

FIG. 6 shows an example of the display screen. The determination result by the determination unit 407 and several types of measurement value to be displayed or the value of the parameter to be displayed may be displayed on the display screen of the display unit 409. In this figure, as an example, the transition of the determination result indicating the quality of the state is displayed on the upper side of the display screen, and the transition of the measurement value to be displayed a-c is displayed on the lower side of the display screen.

The determination result of the state may include the state index value that is output from the classification model 422, the determination threshold (in this figure, as an example, 0), and the comparison result thereof. It should be noted that the comparison result may be displayed as the presence or absence of the alert message indicating the poor state of the facility 2A. In this figure, because the state index value is greater than the determination threshold and the state is good, the alert message is not displayed.

In the display screen, a switching button B1 may be displayed for switching the object to be displayed between the measurement value to be displayed and the value of the parameter to be displayed. In this figure, when the switching button B1 is operated, one or more parameters to be displayed may be displayed instead of the measurement values to be displayed that are being displayed.

In addition, in the display screen, a quality button B2 may be displayed for selecting the type of the label to be added to the measurement data. The quality button B2 may include an OK button and an NG button. When the OK or NG button is operated, the label indicating the good or poor state of the facility 2A may be added to the latest one of each measurement data.

In addition, in the display screen, a frame W may be displayed for specifying any period of the transition of the state index value or the transition of the measurement value to be displayed in response to the operation by the operator. A label may be added by the label addition unit 411 to each measurement data measured in a period specified with the frame W in response to the operation on the quality button B2.

3. Example of Variation

It should be noted that, in the first and second embodiments described above, it is described that the source state data indicating the state of the facility 2B is used for generating the conversion rule 421 and the classification model 422, but the source state data indicating the state of one or more other facility 2 (also referred to as facility 2C, 2D, . . . ) may be further used. The facilities 2C, 2D, . . . may be run by a company that is different from the company that runs the facility 2A or the facility 2B. In this case, at least the acquisition unit 401, 401A, the storage unit 402, the transfer learning unit 403 of the apparatus 4, 4A may be achieved by cloud computing.

In addition, in the second embodiment, it is described that the apparatus 4A includes the transfer learning unit 403, the evaluation unit 404, the setting unit 406, the input unit 410, the label addition unit 411, and the detection unit 412, but it may not include any of them. For example, if the apparatus 4A does not include the transfer learning unit 403, it may perform the state determination by using the conversion rule 421 and the classification model 422 that have been generated. In this case, the apparatus 4A may be an edge device installed in the facility 2A. In addition, in this case, the apparatus 4A may supply the target state data to which the label is added by the label addition unit 411 to the apparatus 4 in the first embodiment, cause the apparatus 4 to generate the conversion rule 421 and the classification model 422, receive the conversion rule 421 and the classification model 422 that have been generated, and use them for the state determination.

In addition, it is described that, in response to the target state data to which the label is added reaching the reference amount, the detection unit 412 may display the message indicating the fact, but it may also perform other operations. For example, the detection unit 412 may supply, in response to the target state data to which the label is added reaching the reference amount, the detection result indicating the fact to the transfer learning unit 403, and use the target state data to which the label is added to generate the conversion rule 421 or the classification model 422, or may supply the detection result to the communication unit that is not shown in the figure, and transmit the target state data to which the label is added to the apparatus 4 in the first embodiment.

In addition, it is described that the apparatus 4A first creates the conversion rule 421 and the classification model 422 through the process of step S31 to S37 and then uses the conversion rule 421 and the classification model 422 through the process of step S43 or later processes. However, if the classification model 422 and the conversion rule 421 that have been created have already been stored in the storage unit 402, the process of step S43 or later processes may be first performed.

In addition, it is described that the apparatus 4A performs the process of step S31 to S37 for generating the conversion rule 421 and the classification model 422, and the process of step S43 to S51 for using the generated conversion rule 421 and classification model 422 in a sequential manner, but it may perform them in a parallel manner.

In addition, it is described that in the process of step S45 to S49, the determination unit 407 performs the determination based on the classification result that is output from the single classification model 422, but it may also determine the quality of the state based on the classification result that is output from a plurality of classification models 422 that are different from each other. In other words, the determination unit 407 may perform the ensemble determination using a plurality of classification models 422. In this case, the determination unit 407 may perform the determination by using several sets of the conversion rule 421 and the classification model 422. For example, the determination unit 407 may determine the quality based on the classification result that is output from the classification model 422 in response to the target state data converted into the data of the common space by a first set of the conversion rule 421 being input into the first set of the classification model 422, the classification result that is output from the classification model 422 in response to the target state data converted into the data of the common space by a second set of the conversion rule 421 being input into the second set of the classification model 422, and the classification result that is output from the classification model 422 in response to the target state data converted into the data of the common space by a third set of the conversion rule 421 being input into the third set of the classification model 422. In this way, the accuracy of the determination result can be increased. It should be noted that a plurality of classification models 422 used for ensemble determination may be generated by using the source state data that are different from each other.

In addition, it is described that the setting unit 406 sets, as the measurement value to be displayed and the parameter to be displayed, a reference number (as an example, three) of measurement values and parameters whose degrees of influence on the state index value is the greatest, but it may set, as the measurement value to be displayed and the parameter to be displayed, any measurement value and parameter selected by the operator.

In addition, the object is described as the facility 2, but it may be another object. For example, the object may be a product manufactured by the facility 2, the object may be a tool or apparatus that is not fixed but that can be moved, may be a natural object such as a body, may be natural environment such as climate and geography, or may be natural phenomena such as a chemical reaction and a biochemical reaction.

Moreover, various embodiments of the present invention may be described with reference to flowcharts and block diagrams, whose blocks may represent (1) steps of processes in which operations are executed or (2) units of apparatuses responsible for executing operations. Certain steps and sections may be implemented by dedicated circuitry, programmable circuitry supplied with computer-readable instructions stored on computer-readable media, and/or processors supplied with computer-readable instructions stored on computer-readable media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

A computer-readable medium may include any tangible device that can store instructions to be executed by a suitable device, and as a result, the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, and the like. More specific examples of computer-readable media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a BLU-RAY (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of processors include computer processors, processing units, microprocessors, digital signal processors, controllers, microcontrollers, and the like.

Figure 7:
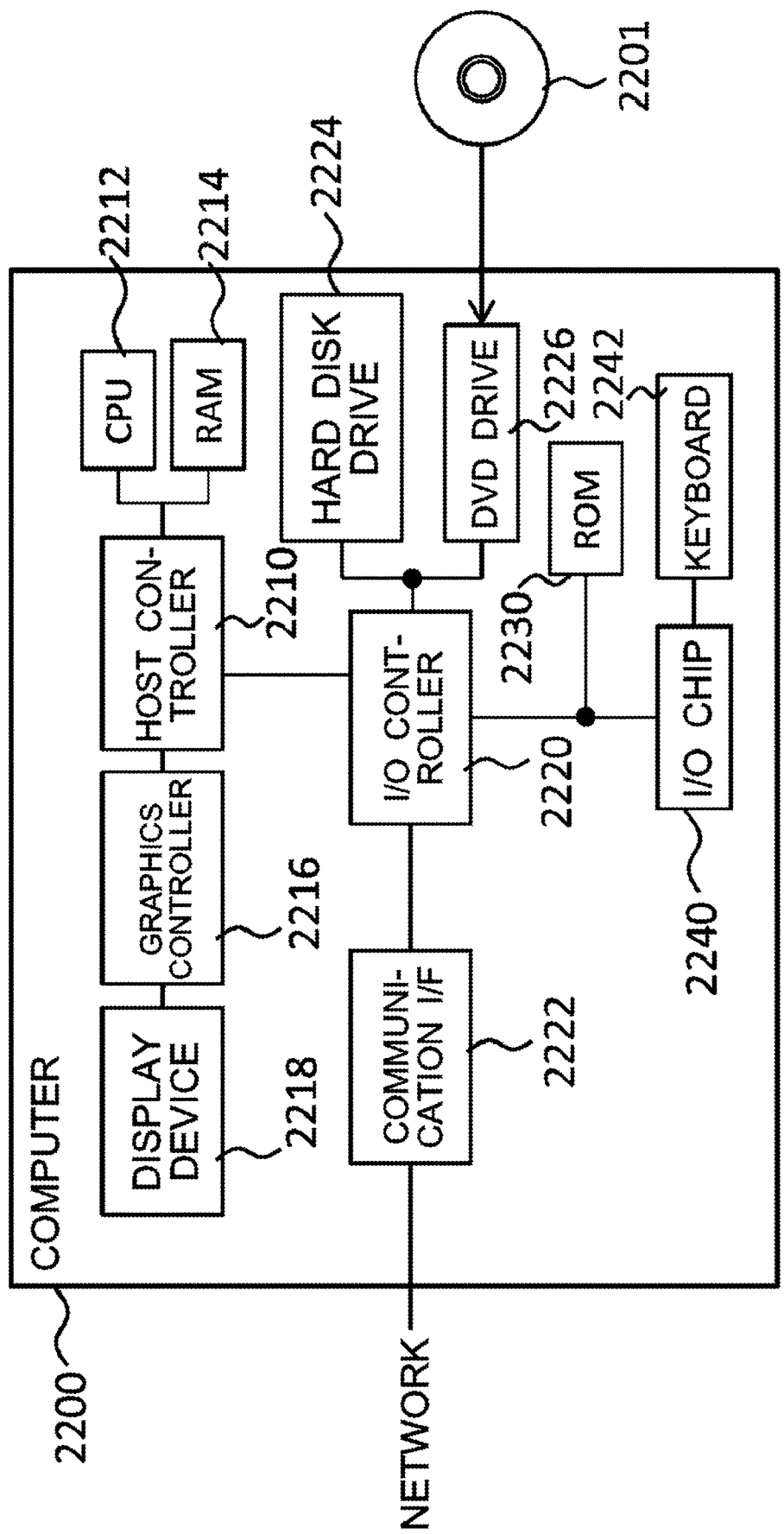
FIG. 7 shows an example of a computer 2200 in which a plurality of aspects of the present invention may be entirely or partially embodied.

FIG. 7 shows an example of a computer 2200 in which a plurality of aspects of the present invention may be entirely or partially implemented. A program that is installed in the computer 2200 can cause the computer 2200 to function as or perform manipulations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain manipulations associated with some or all of the blocks of flowcharts and block diagrams described herein.

The computer 2200 according to this embodiment includes a CPU 2212, a RAM 2214, a graphics controller 2216, and a display device 2218, which are mutually connected by a host controller 2210. The computer 2200 also includes an input/output unit such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, or the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the manipulation or processing of information in accordance with the usage of the computer 2200.

For example, when communication is executed between the computer 2200 and an external device, the CPU 2212 may execute a communication program loaded onto the RAM 2214, and instruct the communication interface 2222 to process the communication based on the processing written in the communication program. Under control of the CPU 2212, the communication interface 2222 reads transmission data stored in a transmission buffering region provided in a recording medium such as the RAM 2214, the hard disk drive 2224, the DVD-ROM 2201, or the IC card, and transmits the read transmission data to the network, or writes reception data received from the network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc. and perform various types of processes on data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of manipulations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software modules described above may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 system
2 facility
4 apparatus
20 sensor
21 equipment
401 acquisition unit
402 storage unit
403 transfer learning unit
404 evaluation unit
405 supply unit
406 setting unit
407 determination unit
408 display control unit
409 display unit
410 input unit
411 label addition unit
412 detection unit
420 data file
421 conversion rule
422 classification model
431 conversion generation unit
432 model generation unit
2200 computer
2201 DVD-ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. An apparatus comprising:
at least one processor;
an acquisition unit that uses the at least one processor for acquiring target state data that are state data in a target domain and source state data that are state data in a source domain and to which a label indicating a quality of a state is added;
a conversion generation unit that uses the at least one processor for generating a conversion rule of the target state data and the source state data into data of a common space based on a distribution of the target state data and a distribution of the source state data;
a model generation unit that uses the at least one processor for generating classification model for classifying a quality of a state indicated by the target state data in the common space using data of the common space to which the label is added;
an evaluation unit that uses the at least one processor for evaluating the classification model using the source state data converted into data of the common space;
a setting unit that uses the at least one processor for setting the classification model as a classification model used for classifying the target state data, in response to an evaluation of the classification model being higher than a reference;

a determination unit that uses the at least one processor for determining a quality of a state based on a classification result that is output from the classification model in response to an input of the target state data that are newly acquired and converted into data of the common space; and a display control unit that uses the at least one processor for displaying a determination result;

wherein the conversion generation unit uses the at least one processor to generate the conversion rule using first source state data and the target state data,
the evaluation unit uses the at least one processor to evaluate the classification model using second source state data that is different from the first source state data, and
the first source state data and the second source state data are included in the source state data;

wherein the conversion generation unit uses the at least one processor to generate the conversion rule so that a distribution of the target state data that have been converted is approximately equal to a distribution of the source state data that have been converted and a variance of each distribution is maximized;

wherein the setting unit uses the at least one processor for setting, as a measurement value to be displayed, at least one measurement value whose influence on a classification result of the classification model is greater than a reference among several types of measurement values included in the target state data, and setting, as a parameter to be displayed, at least one parameter whose influence on a classification result of the classification model is greater than a reference among a plurality of parameters included in data of the common space; and wherein in response to an operation by an operator, the display control unit alternatively uses the at least one processor to switch and display, together with the determination result, the measurement value to be displayed among measurement values of the target state data newly acquired by the acquisition unit and a value of the parameter to be displayed among parameters of the common space into which the target state data newly acquired by the acquisition unit is converted.

2. The apparatus according to claim 1, wherein the acquisition unit uses the at least one processor to acquire the source state data corresponding to a good state and the source state data corresponding to a poor state in a pre-specified ratio based on a label added to the source state data.

3. The apparatus according to claim 1, wherein the acquisition unit uses the at least one processor to further acquire state data outside a distribution range of the target state data that have been already acquired, as the target state data for generating the conversion rule.

4. The apparatus according to claim 1, comprising a label addition unit that uses the at least one processor for adding the label to the target state data measured at a moment specified by an operator.

5. The apparatus according to claim 4, comprising a detection unit that uses the at least one processor for detecting that the target state data to which a label is added by the label addition unit reaches a reference amount.

6. The apparatus according to claim 1, wherein the determination unit uses the at least one processor to determine a quality of a state based on classification results that are output from a plurality of classification models that includes the classification model and is different from each other.

7. A method comprising:

acquiring target state data that are state data in a target domain and source state data that are state data in a source domain and to which a label indicating a quality of a state is added;

generating a conversion rule for converting the target state data and the source state data into data of a common space based on a distribution of the target state data and a distribution of the source state data;

generating a classification model for classifying a quality of a state indicated by the target state data in the common space using data of the common space to which the label is added;

evaluating the classification model using the source state data converted into data of the common space;

setting the classification model as a classification model used for classifying the target state data, in response to an evaluation of the classification model being higher than a reference;

determining a quality of a state based on a classification result that is output from the classification model in response to an input of the target state data newly acquired and converted into data of the common space; and displaying a determination result;

wherein generating the conversion rule includes using first source state data and the target state data,
evaluating the classification model uses second source state data that is different from the first source state data, and
the first source state data and the second source state data are included in the source state data;
wherein
the conversion rule is generated so that a distribution of the target state data that have been converted is approximately equal to a distribution of the source state data that have been converted and a variance of each distribution is maximized;

wherein the setting includes setting, as a measurement value to be displayed, at least one measurement value whose influence on a classification result of the classification model is greater than a reference among several types of measurement values included in the target state data, and setting, as a parameter to be displayed, at least one parameter whose influence on a classification result of the classification model is greater than a reference among a plurality of parameters included in data of the common space; and wherein in response to an operation by an operator, the displaying includes alternatively switching and displaying, together with the determination result, the measurement value to be displayed among measurement values of the target state data newly acquired and a value of the parameter to be displayed among parameters of the common space into which the target state data newly acquired is converted.

8. A method comprising:

converting, using a conversion rule based on a distribution of target state data that are state data in a target domain and source state data that are state data in a source domain and to which a label indicating a quality of a state is added, the target state data into data of a common space shared with the source state data;

newly acquiring the target state data;
determining a quality of a state based on a classification result that is output from a classification model in response to the target state data that are newly acquired and converted into data of the common space being input into a classification model for classifying a quality of a state indicated by the target state data in the common space based on data of a common space to which the label is added;
setting the classification model as a classification model used for classifying the target state data, in response to an evaluation of the classification model being higher than a reference;
controlling a display of a determination result; and
evaluating the classification model using the source state data converted into data of the common space;
wherein
the conversion rule is generated using first source state data and the target state data,
the evaluating the classification model uses second source state data that is different from the first source state data, and
the first source state data and the second source state data are included in the source state data;
wherein
the conversion rule is generated so that a distribution of the target state data that have been converted is approximately equal to a distribution of the source state data that have been converted and a variance of each distribution is maximized;
wherein the setting includes setting, as a measurement value to be displayed, at least one measurement value whose influence on a classification result of the classification model is greater than a reference among several types of measurement values included in the target state data, and setting, as a parameter to be displayed, at least one parameter whose influence on a classification result of the classification model is greater than a reference among a plurality of parameters included in data of the common space; and
wherein in response to an operation by an operator, the controlling the displaying includes alternatively controlling switching and displaying, together with the determination result, the measurement value to be displayed among measurement values of the target state data newly acquired and a value of the parameter to be displayed among parameters of the common space into which the target state data newly acquired is converted.

9. A non-transitory computer readable medium having a program recorded thereon, wherein the program causes a computer to function as:
an acquisition unit for acquiring target state data that are state data in a target domain and source state data that are state data in a source domain and to which a label indicating a quality of a state is added;
a conversion generation unit for generating a conversion rule of the target state data and the source state data into data of a common space based on a distribution of the target state data and a distribution of the source state data;
a model generation unit for generating classification model for classifying a quality of a state indicated by the target state data in the common space using data of the common space to which the label is added;
an evaluation unit for evaluating the classification model using the source state data converted into data of the common space;

a setting unit for setting the classification model as a classification model used for classifying the target state data, in response to an evaluation of the classification model being higher than a reference;
a determination unit for determining a quality of a state based on a classification result that is output from the classification model in response to an input of the target state data that are newly acquired and converted into data of the common space; and
a display control unit for displaying a determination result;
wherein the conversion generation unit generates the conversion rule using first source state data and the target state data,
the evaluation unit evaluates the classification model using second source state data that is different from the first source state data, and
the first source state data and the second source state data are included in the source state data;
wherein
the conversion generation unit generates the conversion rule so that a distribution of the target state data that have been converted is approximately equal to a distribution of the source state data that have been converted and a variance of each distribution is maximized;
wherein the setting unit sets, as a measurement value to be displayed, at least one measurement value whose influence on a classification result of the classification model is greater than a reference among several types of measurement values included in the target state data, and setting, as a parameter to be displayed, at least one parameter whose influence on a classification result of the classification model is greater than a reference among a plurality of parameters included in data of the common space; and
wherein in response to an operation by an operator, the display control unit alternatively switches and displays, together with the determination result, the measurement value to be displayed among measurement values of the target state data newly acquired by the acquisition unit and a value of the parameter to be displayed among parameters of the common space into which the target state data newly acquired by the acquisition unit is converted.

10. A non-transitory computer readable medium having a program recorded thereon, wherein the program causes a computer to function as:
a conversion execution unit for converting, using a conversion rule based on a distribution of target state data that are state data in a target domain and source state data that are state data in a source domain and to which a label indicating a quality of a state is added, the target state data into data of a common space shared with the source state data;
a classification model for classifying a quality of a state indicated in the target state data in the common space based on data of a common space to which the label is added;
an acquisition unit for newly acquiring the target state data;
a determination unit for determining a quality of a state based on a classification result that is output from the classification model in response to an input of the target state data that are newly acquired by the acquisition unit and is converted into data of the common space by the conversion execution unit;

a setting unit for setting the classification model as a classification model used for classifying the target state data, in response to an evaluation of the classification model being higher than a reference;
a display control unit for displaying a determination result; and
an evaluation unit for evaluating the classification model using the source state data converted into data of the common space;
wherein
the conversion rule is generated using first source state data and the target state data,
the evaluation unit uses second source state data that is different from the first source state data, and
the first source state data and the second source state data are included in the source state data;
wherein
the conversion rule is generated so that a distribution of the target state data that have been converted is approximately equal to a distribution of the source state data that have been converted and a variance of each distribution is maximized;
wherein the setting unit sets, as a measurement value to be displayed, at least one measurement value whose influence on a classification result of the classification model is greater than a reference among several types of measurement values included in the target state data, and setting, as a parameter to be displayed, at least one parameter whose influence on a classification result of the classification model is greater than a reference among a plurality of parameters included in data of the common space; and
wherein in response to an operation by an operator, the display control unit alternatively switches and displays, together with the determination result, the measurement value to be displayed among measurement values of the target state data newly acquired by the acquisition unit and a value of the parameter to be displayed among parameters of the common space into which the target state data newly acquired by the acquisition unit is converted.

11. An apparatus comprising:
at least one processor;
a conversion execution unit that uses the at least one processor for converting, using a conversion rule based on a distribution of target state data that are state data in a target domain and source state data that are state data in a source domain and to which a label indicating a quality of a state is added, the target state data into data of a common space shared with the source state data;
a classification model that uses the at least one processor for classifying a quality of a state indicated in the target state data in a common space based on data of the common space to which the label is added;
an acquisition unit that uses the at least one processor for newly acquiring the target state data;
a determination unit that uses the at least one processor for determining a quality of a state based on a classification result that is output from the classification model in response to an input of the target state data that are newly acquired by the acquisition unit and is converted into data of the common space by the conversion execution unit;
a setting unit that uses the at least one processor for setting the classification model as a classification model used for classifying the target state data, in response to an evaluation of the classification model being higher than a reference;
a display control unit that uses the at least one processor for displaying a determination result; and
an evaluation unit for evaluating the classification model using the source state data converted into data of the common space;
wherein
the conversion rule is generated using first source state data and the target state data,
the evaluation unit uses second source state data that is different from the first source state data, and
the first source state data and the second source state data are included in the source state data;
wherein the conversion generation unit uses the at least one processor to generate the conversion rule so that a distribution of the target state data that have been converted is approximately equal to a distribution of the source state data that have been converted and a variance of each distribution is maximized;
wherein the setting unit uses the at least one process or for setting, as a measurement value to be displayed, at least one measurement value whose influence on a classification result of the classification model is greater than a reference among several types of measurement values included in the target state data, and setting, as a parameter to be displayed, at least one parameter whose influence on a classification result of the classification model is greater than a reference among a plurality of parameters included in data of the common space; and
wherein in response to an operation by an operator, the display control unit alternatively uses the at least one processor to switch and display, together with the determination result, the measurement value to be displayed among measurement values of the target state data newly acquired by the acquisition unit and a value of the parameter to be displayed among parameters of the common space into which the target state data newly acquired by the acquisition unit is converted.

* * * * *